(12) United States Patent
Liao (10) Patent No.: US 7,243,399 B2
(45) Date of Patent: Jul. 17, 2007

(54) WRAPPING DEVICE FOR PACKAGES

(76) Inventor: Eric Liao, P.O. Box 63-298, Taichung 40699 (TW)

( * ) Notice: Subject to any disclaimer, the term of this patent is extended or adjusted under 35 U.S.C. 154(b) by 0 days.

(21) Appl. No.: 10/992,580

(22) Filed: Nov. 19, 2004

(65) Prior Publication Data
US 2006/0107494 A1   May 25, 2006

(51) Int. Cl.
  *B65D 63/00* (2006.01)
(52) U.S. Cl. .................. 24/18; 24/129 A; 24/712.9; 24/130
(58) Field of Classification Search .......... 24/130, 24/129 R, 712.9, 30.5 R, 18, 17 R
See application file for complete search history.

(56) References Cited

U.S. PATENT DOCUMENTS

| 590,591 | A | * | 9/1897 | Purdy ........................ 24/18 |
| 947,111 | A | * | 1/1910 | Lorentz ................... 24/129 R |
| 958,168 | A | * | 5/1910 | Petersen .................. 24/129 A |
| 1,146,934 | A | * | 7/1915 | Gleeson ................... 24/129 R |
| 1,225,623 | A | * | 5/1917 | Hall et al. ............... 24/129 R |
| 1,294,321 | A | | 2/1919 | Stout |
| 1,473,942 | A | | 11/1923 | Strauss |
| 1,530,690 | A | | 3/1925 | Oliver |
| 1,773,545 | A | | 8/1930 | Pommer |
| 1,806,162 | A | | 5/1931 | Hahn |
| 1,959,720 | A | | 5/1934 | Koczi |
| 2,188,750 | A | | 1/1940 | Hacker |
| 3,321,816 | A | * | 5/1967 | Monroe ..................... 24/130 |
| 5,722,266 | A | * | 3/1998 | Yeager et al. ............... 24/18 |
| 6,381,816 | B1 | * | 5/2002 | Lai et al. ................. 24/712.9 |

* cited by examiner

*Primary Examiner*—Robert J. Sandy
(74) *Attorney, Agent, or Firm*—Charles E. Baxley (57) ABSTRACT

A wrapping device for packages includes a tying member having two or more arms each having a longitudinal bore and an orifice perpendicular to and communicating with the bore, and a tying cord engaged into the bores and the orifices of the arms, to form two right angle bent portions, and to allow the tying cord to be solidly engaged and retained within the bores and the orifices of the arms. The arms each includes a longitudinal passage communicating with the bore and the orifice, and having a smaller width, to retain the tying cord within the bores of the arms. The arms each includes one or more catches or teeth to engage with and to catch and retain the tying cord within the bores of the arms.

6 Claims, 10 Drawing Sheets

WRAPPING DEVICE FOR PACKAGES

BACKGROUND OF THE INVENTION

1. Field of the Invention

The present invention relates to a wrapping device, and more particularly to a wrapping device for solidly tying or wrapping packages.

2. Description of the Prior Art

Various kinds of typical tying or wrapping devices have been developed for tying or wrapping packages, and comprise a planar body portion including one or more tongues or extensions, one or more oblique slots, cuts or kerfs, and one or more eccentrically located holes formed therein, for engaging with tying cords, and for tying or wrapping the packages.

For example, U.S. Pat. No. 1,294,321 to Stout discloses one of the typical tying or wrapping devices comprising one or more tying cords engageable around the packages, and engaged with tongues or extensions, oblique slots, cuts or kerfs, or eccentrically located holes of a planar body portion, in order to tie or wrap the packages.

However, the tying cords have to be engaged around and around the packages, but also may not be solidly attached to the typical tying or wrapping devices, and may be easily disengaged from the typical tying or wrapping devices.

U.S. Pat. No. 1,473,942 to Strauss discloses another typical tying or fastening device comprising a base that is required to be engaged or attached onto the packages by prongs, and a head attached to the base for engaging with a tying cord. However, the fastening device may not be easily attached onto harder packages that are made of such as plastic or metal materials, and the tying cord may not be easily attached to the typical fastening devices.

U.S. Pat. No. 1,530,690 to Oliver discloses a further typical tying or fastening device comprising a flat plate for engaging or attaching onto the packages, and a dished or concavo-convex plate is attached onto the base flat plate with a rivet for engaging with tying cords. However, similarly, the tying cord may not be solidly attached to the typical fastening devices and may be easily disengaged from the typical tying or fastening devices.

U.S. Pat. No. 1,773,545 to Pommer discloses a still further typical tying or fastening device comprising a disked-shaped element having a series of equally spaced peripheral wedge-shaped slots formed therein and arranged to register with slots of another disk, for engaging or attaching onto packages with one or more tying cords. However, similarly, the tying cords may not be solidly attached to the typical fastening devices and may have a good chance to be disengaged from the typical tying or fastening devices.

U.S. Pat. No. 1,806,162 to Hahn discloses a still further typical fastening device comprising a dished plate including a planar body portion having a number of clamping slits and apertures formed therein, for engaging with tying cords, and for tying or wrapping the packages. However, similarly, the tying cords may not be solidly attached to the typical fastening devices and may have a good chance to be disengaged from the typical tying or fastening devices.

U.S. Pat. No. 1,959,720 to Koczi discloses a still further typical package tying device comprising a clamping disk attached to a base plate, in order to form a clamping recess between the clamping disk and the base plate. However, similarly, the tying cords may not be solidly attached to the typical package tying devices and may have a good chance to be disengaged from the typical package tying devices.

U.S. Pat. No. 2,186,750 to Hacker discloses a still further typical package wrapping device comprising a medallion that is required to be attached to a box with an eyelet, or attached to an auxiliary base member with an eyelet, in order to form a spacing between the medallion and the box or the auxiliary base member, and to receive a tying ribbon.

However, similarly, the tying cords or ribbons may not be solidly engaged or received in the spacing between the medallion and the box or the auxiliary base member, and thus may not be solidly attached to the typical package wrapping devices and may have a good chance to be disengaged from the typical package wrapping devices.

The present invention has arisen to mitigate and/or obviate the afore-described disadvantages of the conventional tying or wrapping devices for packages.

SUMMARY OF THE INVENTION

The primary objective of the present invention is to provide a wrapping device for solidly tying or wrapping packages and for preventing the wrapping device from being disengaged from the packages inadvertently.

In accordance with one aspect of the invention, there is provided a wrapping device for packages, the wrapping device comprising a tying body including a first arm and at least one second arm extended therefrom, and each having a longitudinal bore axially formed therein and an orifice vertically formed therein and perpendicular to and communicating with the bore thereof, and a tying cord engaged into the bores and the orifices of the arms respectively, to form two right angle bent portions, and to allow the tying cord to be solidly engaged and retained within the bores and the orifices of the arms respectively.

The arms each includes a longitudinal passage axially formed therein and parallel to the bore thereof, and communicating with the bore and the orifice thereof, and having a width smaller than a diameter of the bores of the arms, to retain the tying cord within the bores of the arms.

The arms each includes at least one catch extended into the passage thereof, to engage with the tying cord and to catch and anchor and retain the tying cord within the bores of the arms. The arms each includes at least one tooth extended into the orifice thereof, to engage with and to anchor the tying cord to the arms.

The arms each includes an aperture formed therein and perpendicular to and communicating with the orifice thereof, to receive the tying cord. Alternatively, the arms each includes a second bore formed therein and parallel to the longitudinal bore thereof.

The arms each includes a narrowed neck portion formed therein and communicating with the aperture thereof, and also perpendicular to and communicating with the orifice thereof, and to allow the tying cord to be engaged into the aperture via the narrowed neck portion of the arms respectively.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1–4, a wrapping device 10 in accordance with the present invention is provided for tying or wrapping one or more packages 70 with one or more resilient or elastic tying cords 80, and comprises a spatial, but not planar, tying member or tying body 11 including two or more arms 12 extended therefrom, such as two arms 12 (FIGS. 1–8, 12–16) extended therefrom and aligned with each other or arranged in line with each other, or four arms 12 (FIGS. 9–11, 17–19) arranged in cross-shape, or the like.

For example, the arms 12 of the spatial tying body 11 may be arrange in line with each other and may be formed into an oval or olivary shape having reduced or rounded ends, and each may include a longitudinal bore 13 axially formed therein or formed along an X-axis, and an orifice 14 vertically formed therein or formed along a Z-axis and preferably perpendicular to and communicating with the bore 13 thereof (FIGS. 4–8), for receiving or engaging with the resilient or elastic tying cords 80 respectively.

Figure 1:
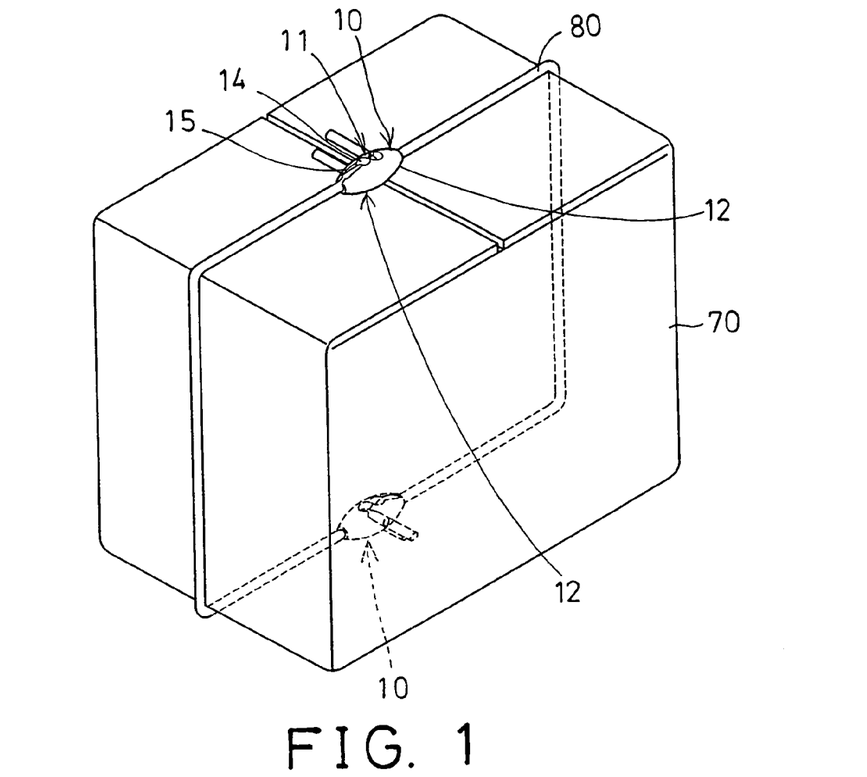
FIG. 1 is a perspective view illustrating an attachment of a wrapping device in accordance with the present invention to a package.
Figure 2:
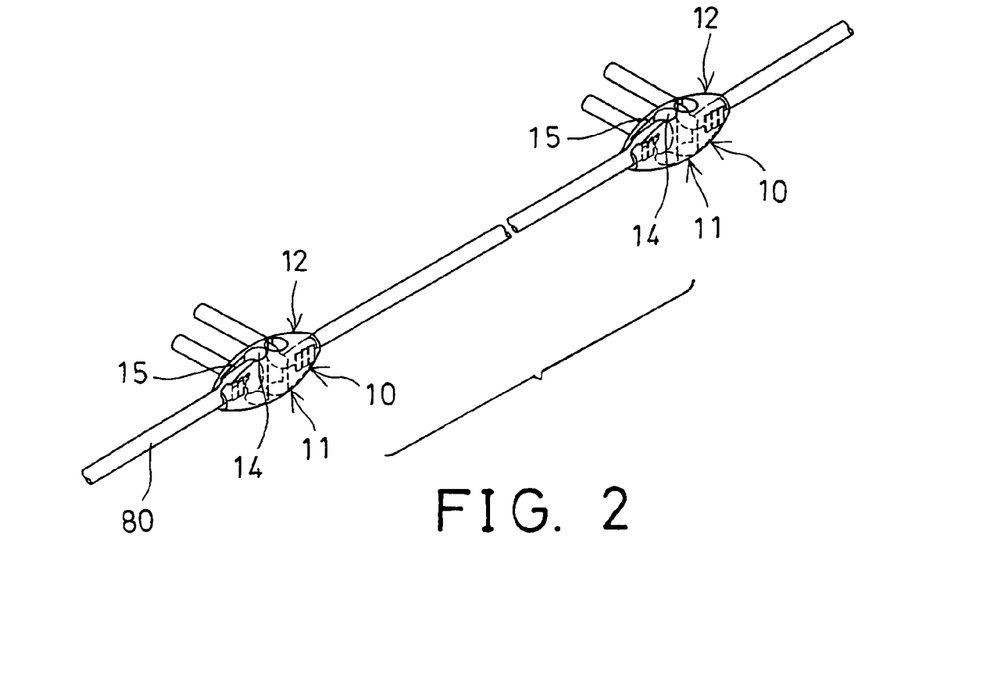
FIG. 2 is a perspective view illustrating the operation of the wrapping device.
Figure 3:
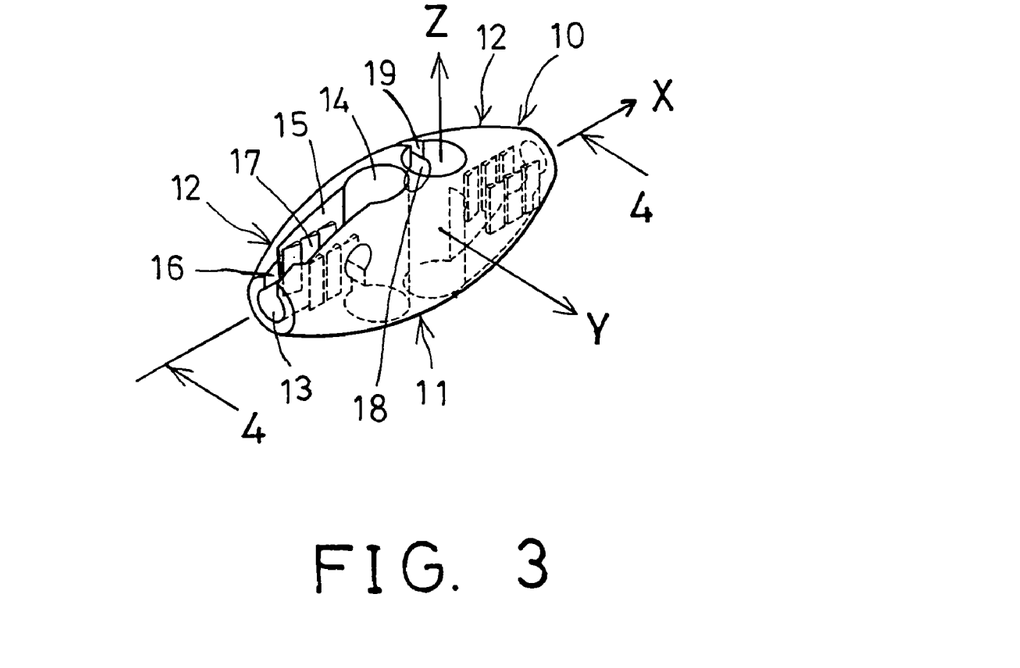
FIG. 3 is a perspective view illustrating one of the wrapping devices.
Figure 4:
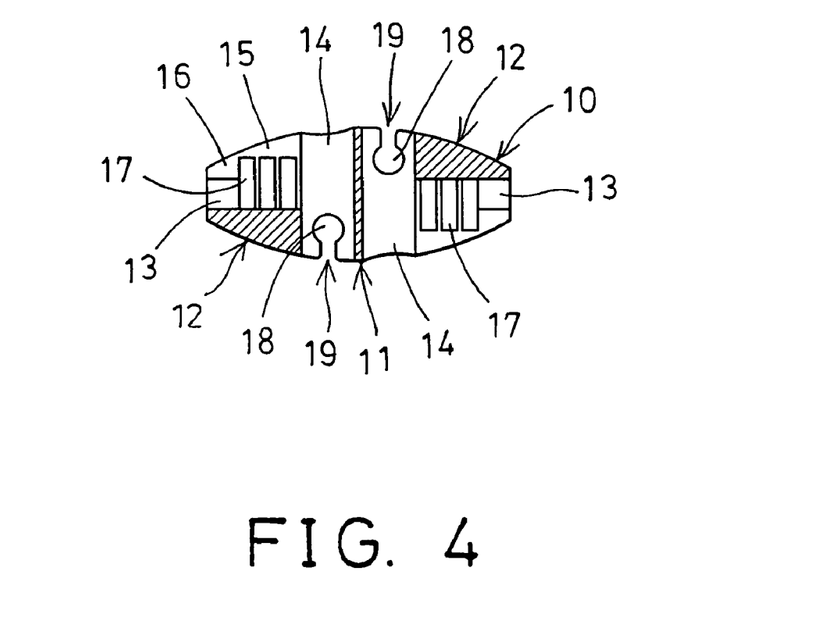
FIG. 4 is a cross sectional view of the wrapping device, taken along lines 4—4 of FIG. 3.
Figure 5:
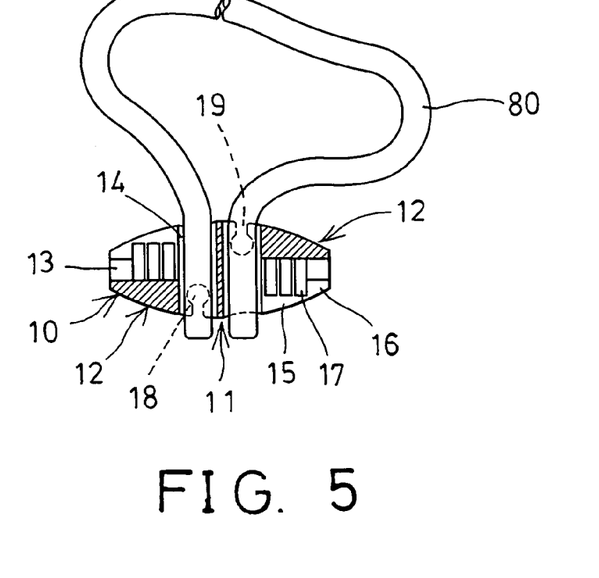
FIGS. 5, 6, 7, 8 are cross sectional views similar to FIG. 4, illustrating the operation of the wrapping device.
Figure 6:
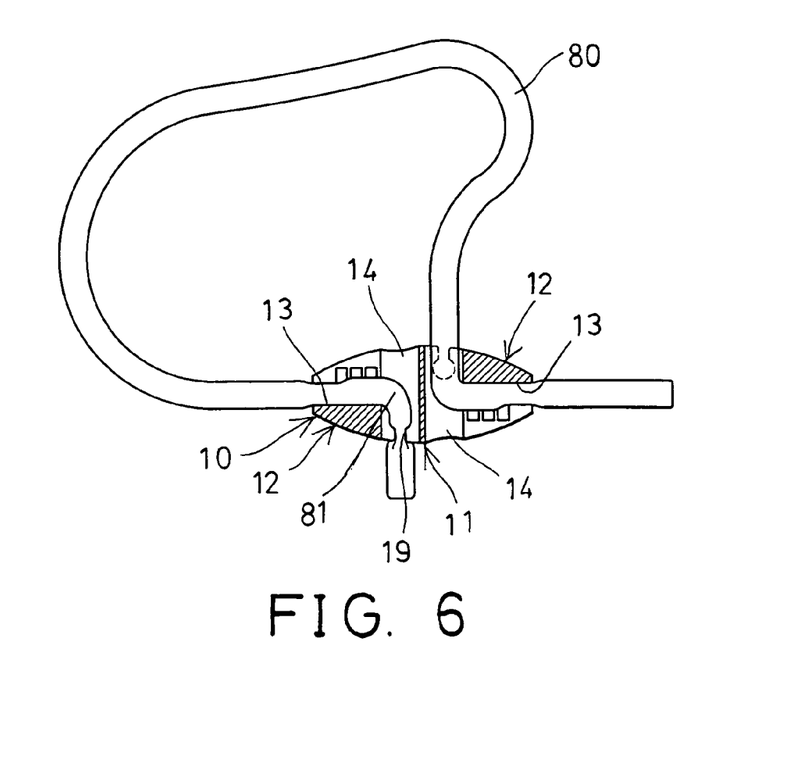
Figure 7:
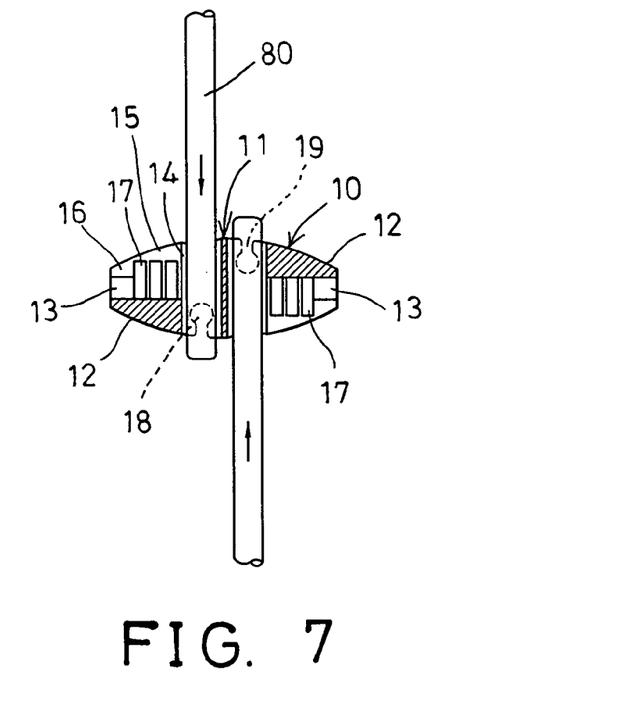
Figure 8:
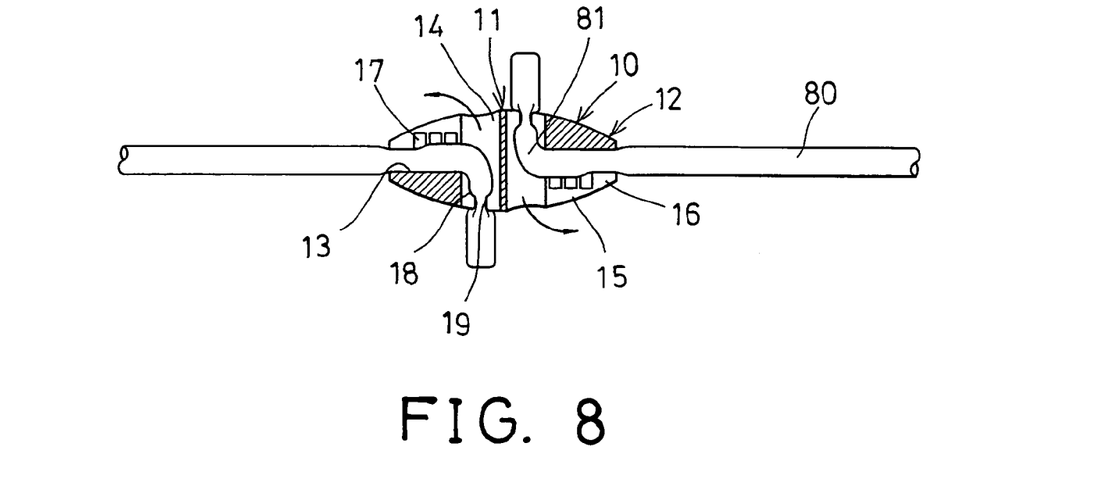

For example, as best shown in FIGS. 6 and 8, after the resilient or elastic tying cords 80 are engaged into the bores 13 and the orifices 14 of the arms 12 respectively, the tying cords 80 may each be formed into a right angle bent portion 81, to allow the tying cords 80 to be solidly engaged and retained within the bores 13 and the orifices 14 of the arms 12 respectively.

It is preferable that the arms 12 each further includes a longitudinal passage 15 axially formed therein and extended along the X-axis, and parallel to the bore 13 thereof, and also communicating with the bore 13 and the orifice 14 thereof, for allowing the tying cords 80 to be easily engaged into the bores 13 of the arms 12 respectively. The passages 15 of the arms 12 include a width or diameter smaller than that of the bores 13 of the arms 12, to allow the tying cords 80 to be clamped or anchored and retained within the bores 13 of the arms 12.

It is further preferable that the arms 12 each includes one or more catches 16 (FIG. 3) extended into the passage 15 thereof, for engaging with the tying cords 80, and for further catching or anchoring and retaining the tying cords 80 within the bores 13 of the arms 12, and for preventing the tying cords 80 from being disengaged from the bores 13 of the arms 12. The arms 12 each preferably includes one or more teeth 17, such as ratchet teeth 17 extended into the orifice 14 and/or the passage 15 thereof, for further anchoring the tying cords 80 to the arms 12.

The arms 12 each further includes an aperture 18 laterally formed therein and extended along a Y-axis, and perpendicular to and communicating with the orifice 14 thereof, for receiving or engaging with the resilient or elastic tying cords 80 respectively, and a narrowed neck portion 19 formed therein and communicating with the aperture 18 thereof, and also perpendicular to and communicating with the orifice 14 thereof, and arranged to allow the resilient or elastic tying cords 80 to be engaged into and maintained within the apertures 18 of the arms 12 via the narrowed neck portion 19 respectively.

In operation, as shown in FIGS. 1–2 and 5–8, the ends or the intermediate portions of the tying cords 80 may first be engaged into the orifices 14 of the arms 12 respectively (FIGS. 5, 7), and the tying cords 80 may then be forced and engaged into the bores 13 of the arms 12 respectively, in order to form the right angle bent portions 81, and thus to allow the tying cords 80 to be solidly engaged and retained within the bores 13 and the orifices 14 of the arms 12.

The tying cords 80 may then be forced and engaged into the apertures 18 of the arms 12 via the narrowed neck portions 19 respectively, to allow the tying cords 80 to be further solidly engaged and secured and anchored to the arms 12. The catches 16 and/or the teeth 17 may further be used to anchor and secure the tying cords 80 to the arms 12.

Figure 9:
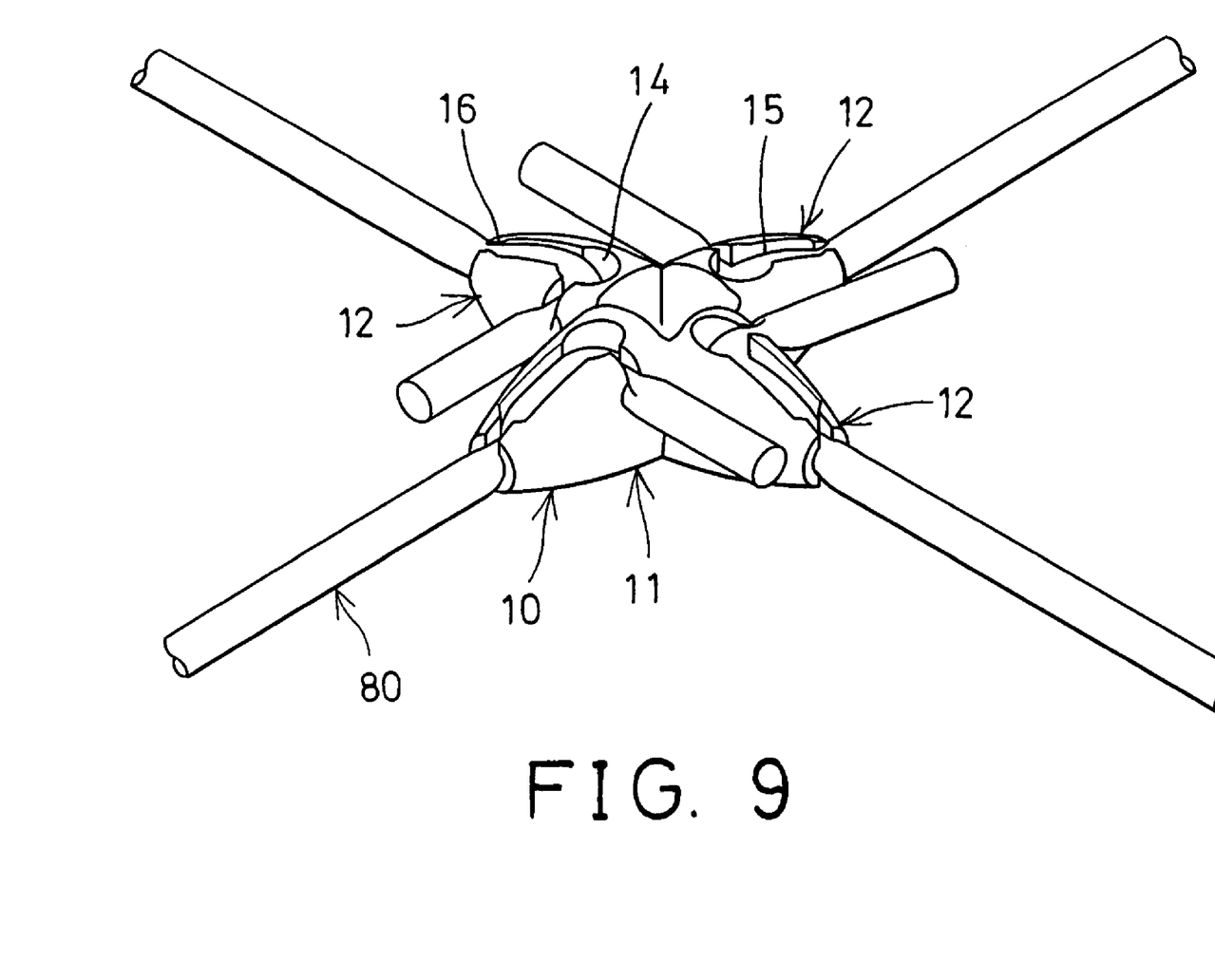
FIG. 9 is a perspective view illustrating the operation of another embodiment of the wrapping device.
Figure 10:
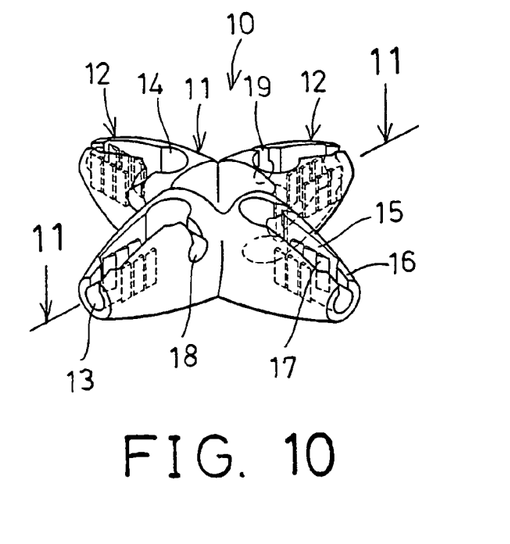
FIG. 10 is a perspective view of the wrapping device as shown in FIG. 9.
Figure 11:
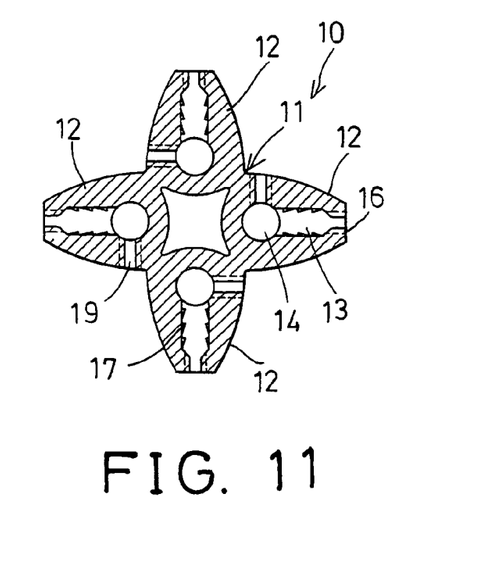
FIG. 11 is a cross sectional view taken along lines 11—11 of FIG. 10.
Figure 12:
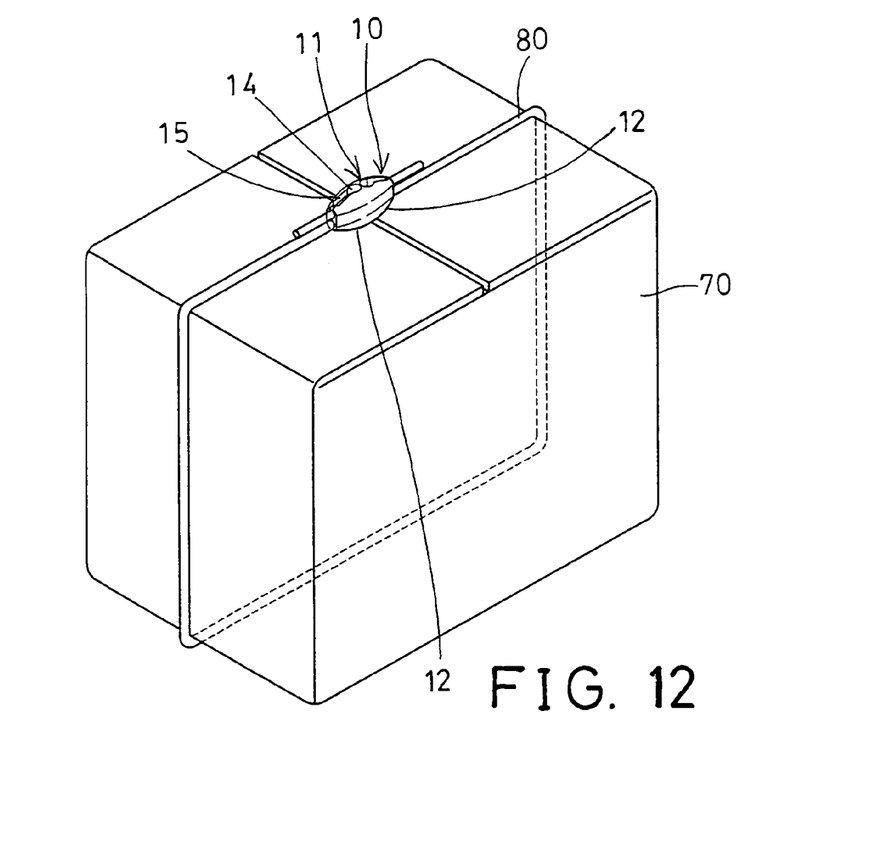
FIG. 12 is a perspective view illustrating the operation of a further embodiment of the wrapping device.
Figure 13:
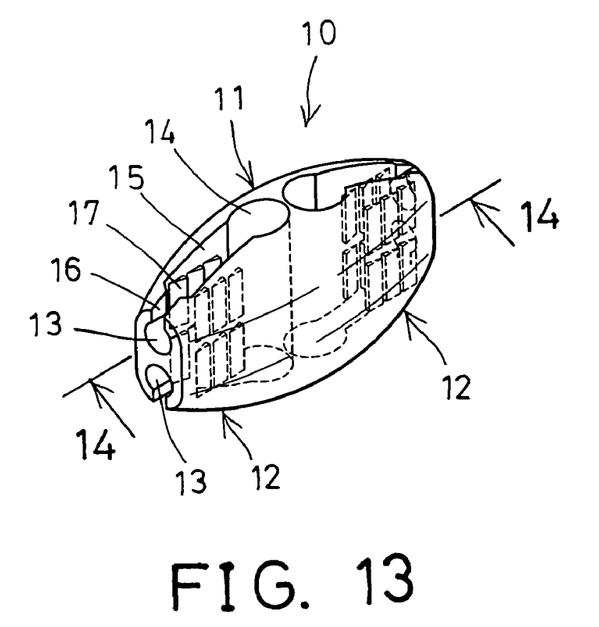
FIG. 13 is a perspective view of the wrapping device as shown in FIG. 12.
Figure 14:
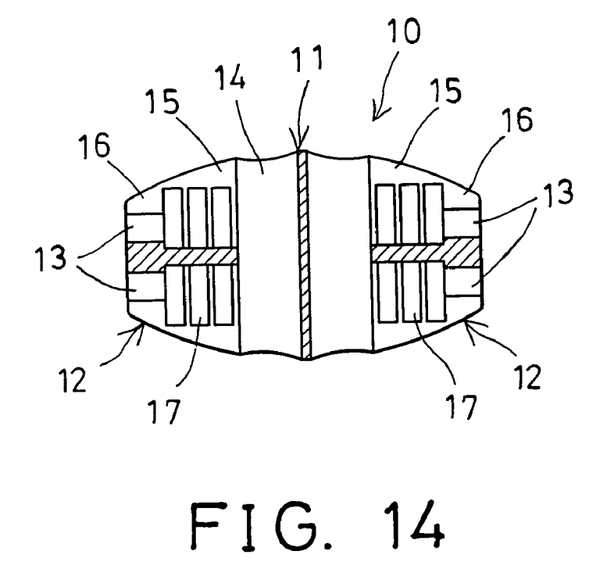
FIG. 14 is a cross sectional view taken along lines 14—14 of FIG. 13.
Figure 15:
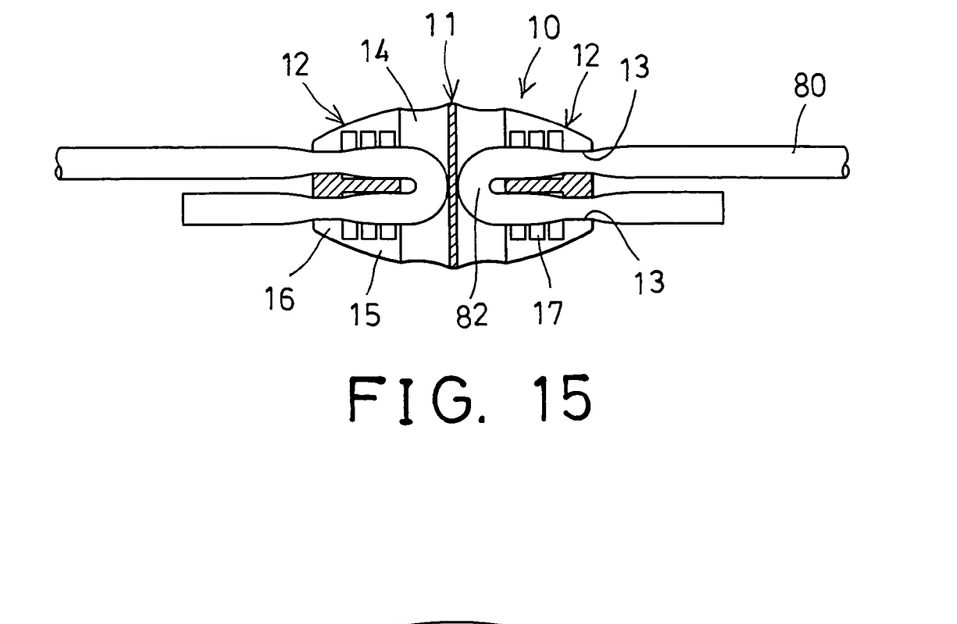
FIGS. 15, 16 are cross sectional views similar to FIG. 14, illustrating the operation of the wrapping device.
Figure 16:
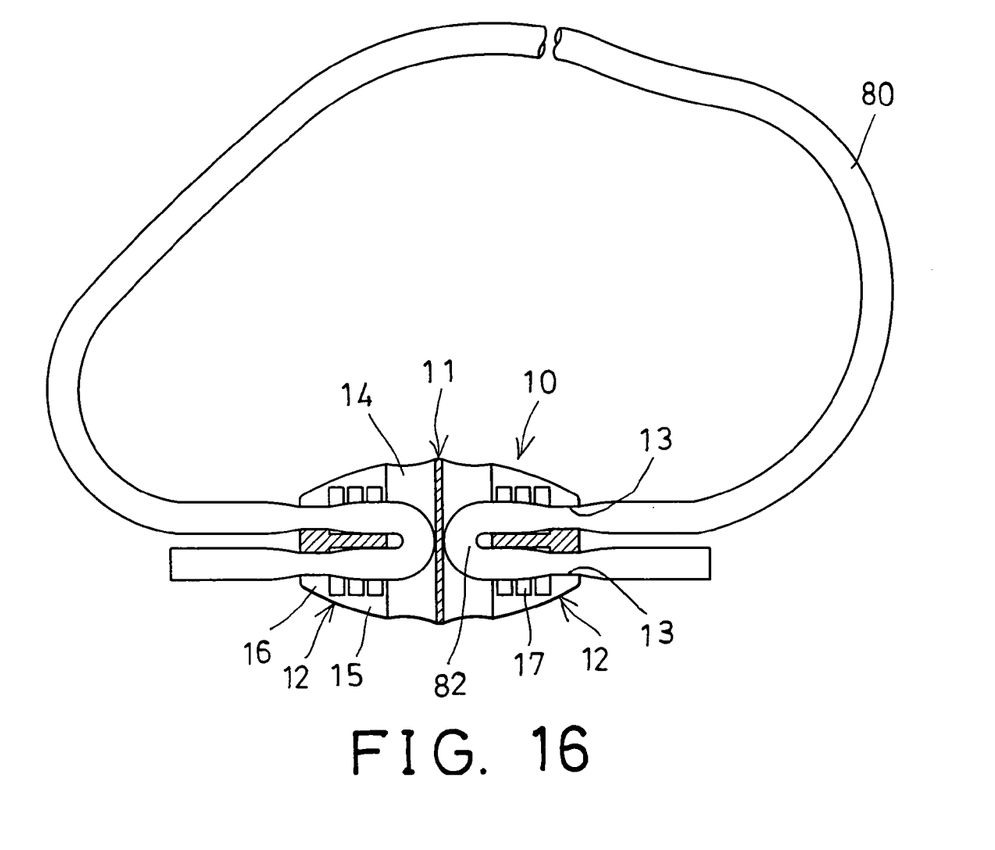
Figure 17:
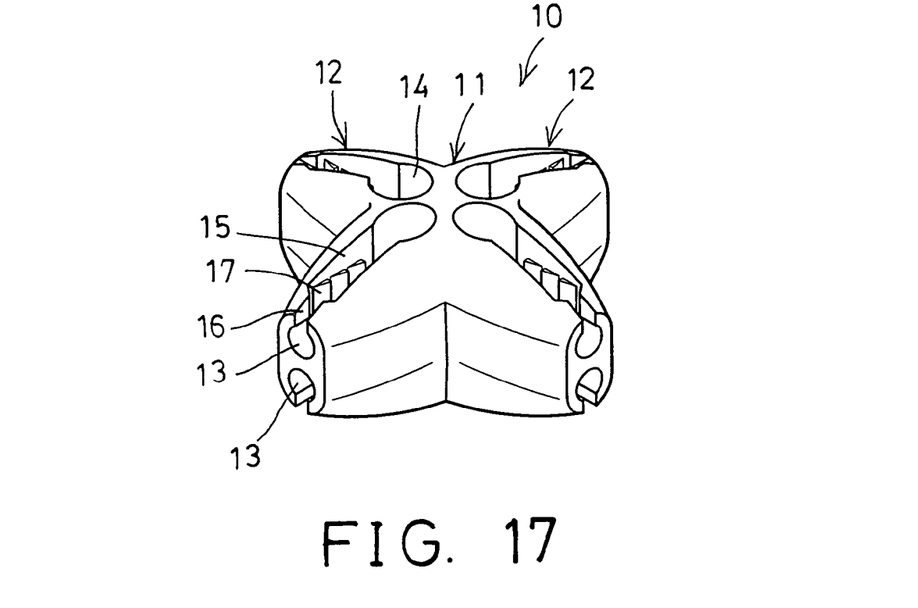
FIG. 17 is a perspective view illustrating a still further embodiment of the wrapping device.
Figure 18:
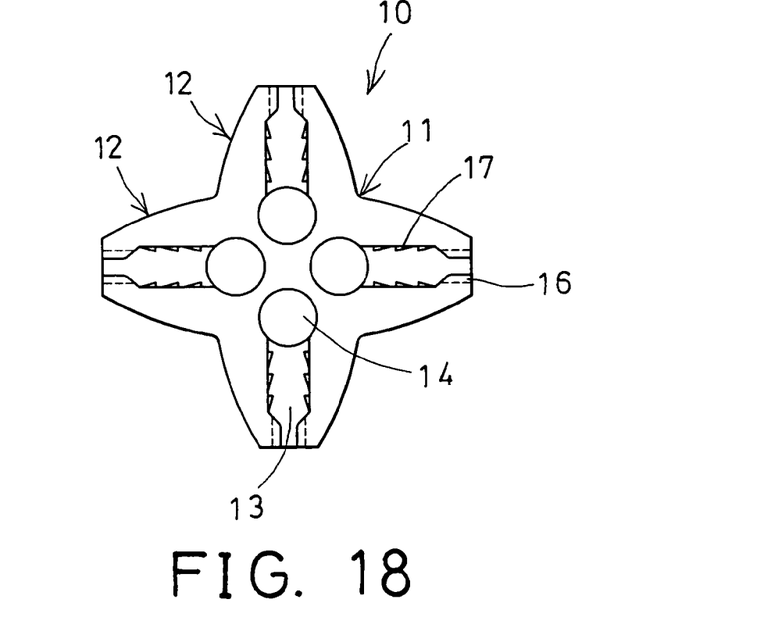
FIG. 18 is a top plan schematic view of the wrapping device as shown in FIG. 17.
Figure 19:
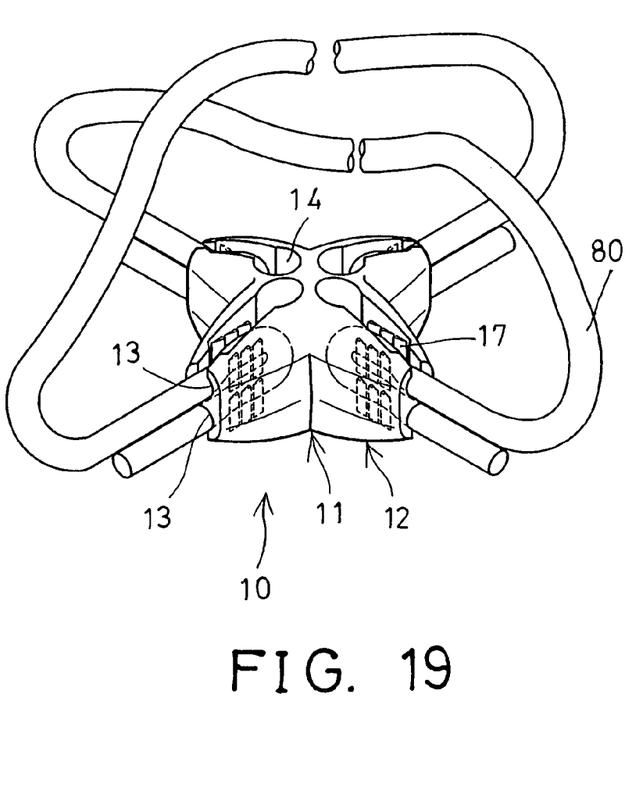
FIG. 19 is a perspective view illustrating the operation of the further embodiment of the wrapping device as shown in FIGS. 17 and 18.

Referring next to FIGS. 9–11, the spatial tying body 11 may include three or more arms 12 extended therefrom, such as four arms 12 as shown in FIGS. 9–11, each arm 12 also includes a longitudinal bore 13 axially formed therein, an orifice 14 vertically formed therein and perpendicular to and communicating with the bore 13 thereof, a longitudinal passage 15 axially formed therein and also communicating with the bore 13 and the orifice 14 thereof, one or more catches 16 extended into the passage 15 thereof, and one or more teeth 17 extended into the orifice 14 and/or the passage 15 thereof, for further anchoring the tying cords 80 to the arms 12.

Further alternatively, as shown in FIGS. 12–19, instead of the apertures 18 and the narrowed neck portions 19 of the arms 12, the arms 12 may each include two longitudinal bores 13 axially formed therein or formed along the X-axis, and parallel to each other, and two longitudinal passage 15 axially formed therein and extended along the X-axis, and parallel to the bore 13 thereof, and also communicating with the bore 13 and the orifice 14 thereof, for allowing the tying cords 80 to be easily engaged into the bores 13 of the arms 12 respectively to form a 180 degree turn or bent portion 82, and solidly engaged and retained within the bores 13 and the orifices 14 of the arms 12 by the catches 16 and/or the teeth 17.

Figure 20:
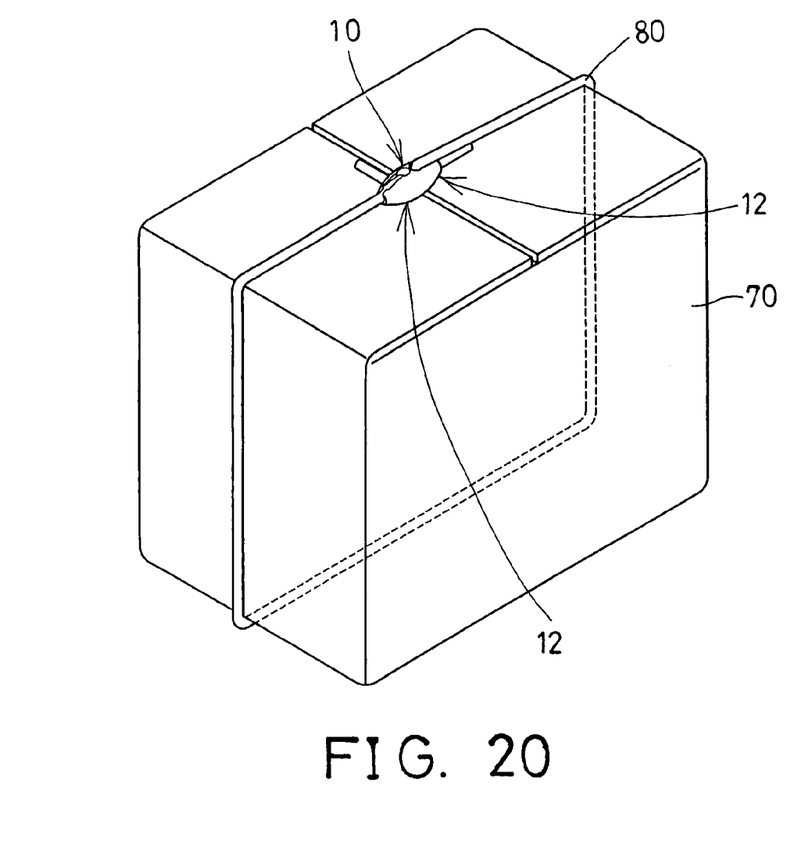
FIG. 20 is a perspective view similar to FIGS. 1, 12, illustrating a still further embodiment of the wrapping device.

Further alternatively, as shown in FIG. 20, one of the arms 12 may include an aperture 18 and an narrowed neck portion 19 formed therein and communicating with the orifice 14 thereof, for allowing the resilient or elastic tying cord 80 to formed a right angle bent portion 81 therein, and the other arm 12 may include two longitudinal bores 13 axially formed therein and parallel to each other, to receive the resilient or elastic tying cord 80 therein.

Accordingly, the wrapping device for packages in accordance with the present invention may be used for solidly tying or wrapping packages and for preventing the wrapping device from being disengaged from the packages inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wrapping device for packages, said wrapping device comprising:

a tying body including a first arm and at least one second arm extended therefrom, and each having a longitudinal bore axially formed therein and an orifice vertically formed therein and perpendicular to and communicating with said bore thereof, and said first arm and said at least one second arm each including a second bore formed therein and parallel to said longitudinal bore thereof, and a tying cord engaged into said bores and said orifices of said first arm and said at least one second arm respectively, to form two right angle bent portions, and to allow said tying cord to be solidly engaged and retained within said bores and said orifices of said first arm and said at least one second arm respectively.

2. The wrapping device as claimed in claim 1, wherein said first arm and said at least one second arm each includes a longitudinal passage axially formed therein and parallel to said bore thereof and communicating with said bore and said orifice thereof, and having a width smaller than a diameter of said bores of said first arm and said at least one second arm to retain said tying cord within said bores of said first arm and said at least one second arm.

3. The wrapping device as claimed in claim 2, wherein said first arm and said at least one second arm each includes at least one catch extended into said passage thereof, to engage with said tying cord and to catch and anchor and retain said tying cord within said bores of said first arm and said at least one second arm.

4. The wrapping device as claimed in claim 1, wherein said first arm and said at least one second arm each includes at least one tooth extended into said orifice thereof, to engage with and to anchor said tying cord to said first arm and said at least one second arm.

5. The wrapping device as claimed in claim 1, wherein said first arm and said at least one second arm each includes an aperture formed therein and perpendicular to and communicating with said orifice thereof, to receive said tying cord.

6. The wrapping device as claimed in claim 5, wherein said first arm and said at least one second arm each includes a narrowed neck portion formed therein and communicating with said aperture thereof, and also perpendicular to and communicating with said orifice thereof, and to allow said tying cord to be engaged into said aperture via said narrowed neck portion of said first arm and said at least one second arm respectively.

* * * * *